United States Patent
Brisebois et al.

(10) Patent No.: US 9,389,879 B2
(45) Date of Patent: Jul. 12, 2016

(54) SYSTEM AND METHOD FOR MANIPULATING USER-INTERFACE DISPLAY ITEMS FOR WEB WIDGETS

(71) Applicant: Dell Products L.P., Round Rock, TX (US)

(72) Inventors: Michel Brisebois, Renfrew (CA); Vineetha Abraham, Ottawa (CA); Daniel Barker, Renton, WA (US); Nicolae Anca, Ottawa (CA); Xuejun Situ, Ottawa (CA); Peizhen Tian, Stittsville (CA); Yuan Liang, Ottawa (CA); Xiang Chen, Greenwood Villiage, CO (US)

(73) Assignee: Dell Products L.P., Round Rock, TX (US)

( * ) Notice: Subject to any disclaimer, the term of this patent is extended or adjusted under 35 U.S.C. 154(b) by 147 days.

(21) Appl. No.: 13/739,731

(22) Filed: Jan. 11, 2013

(65) Prior Publication Data

US 2014/0201643 A1 Jul. 17, 2014

(51) Int. Cl.
*G06F 3/00* (2006.01)
*G06F 9/44* (2006.01)
*G06F 3/0484* (2013.01)
*G06F 17/30* (2006.01)

(52) U.S. Cl.
CPC ............ *G06F 9/4443* (2013.01); *G06F 3/0484* (2013.01); *G06F 8/38* (2013.01); *G06F 17/3089* (2013.01)

(58) Field of Classification Search
None
See application file for complete search history.

(56) References Cited

U.S. PATENT DOCUMENTS

| | | | |
|---|---|---|---|
| 5,596,702 A * | 1/1997 | Stucka et al. | 715/746 |
| 8,726,147 B1 * | 5/2014 | Beatty et al. | 715/234 |
| 2004/0199392 A1 * | 10/2004 | Khatri et al. | 704/277 |
| 2006/0041879 A1 * | 2/2006 | Bower | G06F 9/4443 717/162 |
| 2008/0288955 A1 * | 11/2008 | Brockway et al. | 719/311 |
| 2009/0037830 A1 | 2/2009 | Kulkarni et al. | |
| 2009/0276206 A1 | 11/2009 | Fitzpatrick et al. | |
| 2010/0146378 A1 * | 6/2010 | Bank et al. | 715/234 |
| 2011/0179073 A1 | 7/2011 | Nilsson | |
| 2012/0291009 A1 | 11/2012 | Khare et al. | |
| 2012/0324418 A1 | 12/2012 | Fallon | |

OTHER PUBLICATIONS

The Microsoft Developer Network, "Machine Translation Services in SharePoint 2013", Jul. 16, 2012, 13 pages.
The Microsoft Developer Network, "Walkthrough: Localizing a Web Part", Dec. 2010, 16 pages.
geekswithblogs.net, "Sharep10nt, All About SharePoint 2010/2013", Dec. 14, 2010, 19 pages.

(Continued)

*Primary Examiner* — Jeffrey A Gaffin
*Assistant Examiner* — Nhat-Huy T Nguyen
(74) *Attorney, Agent, or Firm* — Winstead PC (57) ABSTRACT

In one embodiment, a method includes receiving a request for web-widget manipulation. The request includes a scope of manipulation. The method further includes identifying at least one managed web widget as being covered by the scope of manipulation. In addition, the method includes identifying at least one instance of the at least one managed web widget as being covered by the scope of manipulation. Further, the method includes extracting a plurality of user-interface (UI) display items relative to the at least one managed web widget and the at least one instance. The plurality of UI display items includes at least one global UI display item and at least one website-level UI display item.

15 Claims, 9 Drawing Sheets

(56) References Cited

OTHER PUBLICATIONS

U.S. Appl. No. 14/976,652, Wu et al.
U.S. Appl. No. 14/858,299, Qian et al.
Bamboo Solutions; "Highlights of PM Central: SA12 How this Product Benefits your Business"; http://bamboo.docfactory.com/#!doc/Project_Management/PM_Central/topic:Highlights_of_PM_Central; Oct. 24, 2014; 1 page.
aarebrot.net; "Changing the Properties of an Existing Web Part using PowerShell"; http://aarebrot.net/blog/2010/09/changing-the-properties-of-an-existing-web-part-using-powershell/; Sep. 2, 2010; 3 pages.
Wikimedia Foundation, Inc.; "Microsoft SharePoint Designer"; https://en.wikipedia.org/wiki/Microsoft_Sharepoint_Designer; last modified on Aug. 14, 2015; 3 pages.
Lightningtools; "Lightning Conductor Web Part 2010: Manual 5.1"; last update Sep. 8, 2014; 110 pages.

* cited by examiner

SYSTEM AND METHOD FOR MANIPULATING USER-INTERFACE DISPLAY ITEMS FOR WEB WIDGETS

BACKGROUND

1. Technical Field

The present invention relates generally to content management and more particularly, but not by way of limitation, to systems and methods for manipulating user-interface display items for web widgets.

2. History of Related Art

In content-management systems based on, for example, Microsoft SharePoint, web widgets known as web parts are frequently deployed that provide additional features and functionality to a web user interface (UI). Web widgets can include, for example, form builders, calendars, media viewers, and the like. Web widgets are typically utilized in a customized form by owners of websites. On any given content-management system, a web widget may be deployed on thousands of websites and therefore may have many thousands of distinct customizations. It is sometimes desirable to manipulate all instances of a web widget en masse. For example, it may be necessary to translate UI display items for the web widget into another language such as Spanish. Typically, the only way all instances of the web widget can be manipulated en masse is by replacing the web widget with a new version. However, this solution results in all website customizations being lost.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method includes, on an information handling system, receiving a request for web-widget manipulation. The request includes a scope of manipulation. The method further includes identifying, by the information handling system, at least one managed web widget as being covered by the scope of manipulation. In addition, the method includes identifying, by the information handling system, at least one instance of the at least one managed web widget as being covered by the scope of manipulation. Further, the method includes extracting, by the information handling system, a plurality of user-interface (UI) display items relative to the at least one managed web widget and the at least one instance. The plurality of UI display items includes at least one global UI display item and at least one website-level UI display item.

In one embodiment, an information handling system includes a processing unit. The processing unit is operable to receive a request for web-widget manipulation. The request includes a scope of manipulation. The processing unit is further operable to identify at least one managed web widget as being covered by the scope of manipulation. In addition, the processing unit is operable to identify at least one instance of the at least one managed web widget as being covered by the scope of manipulation. Further, the processing unit is operable to extract a plurality of user-interface (UI) display items relative to the at least one managed web widget and the at least one instance. The plurality of UI display items comprises at least one global UI display item and at least one website-level UI display item.

In one embodiment, a computer-program product includes a computer-usable medium having computer-readable program code embodied therein. The computer-readable program code is adapted to be executed to implement a method. The method includes receiving a request for web-widget manipulation. The request includes a scope of manipulation. The method further includes identifying at least one managed web widget as being covered by the scope of manipulation. In addition, the method includes identifying at least one instance of the at least one managed web widget as being covered by the scope of manipulation. Further, the method includes extracting a plurality of user-interface (UI) display items relative to the at least one managed web widget and the at least one instance. The plurality of UI display items includes at least one global UI display item and at least one website-level UI display item.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, user-interface (UI) display items of managed web widgets can be manipulated more comprehensively and without loss of website customizations via principles described herein. In a typical embodiment, UI display items are systematically extracted at both a global level and a website level. The extracted UI display items can then be manipulated in a desired fashion and made accessible in the manipulated form to end users. As described in more detail below, in a typical embodiment, the extraction, manipulation, and accessibility can be accomplished automatically across myriads of websites that may utilize a given web widget.

For purposes of this patent application, a web widget, often referred to herein simply as a widget, is a reusable software application that can be embedded within a website. Web widgets can include, for example, form builders, calendars, media viewers, and the like. A managed web widget, which may be periodically referenced herein simply as a managed widget, is a web widget that is centrally maintained on a content-management system for use by websites hosted thereby. Each use of a managed web widget by a website may be referenced herein as an instance of that managed web widget.

A content-management system, as used herein, is a system that allows publishing, editing, modifying, and/or maintenance of content from a central interface. The content-management system can be based on, for example, Microsoft SharePoint. Content-management systems typically maintain a compiled widget assembly for each managed web widget. A compiled widget assembly, as used herein, is a deployable package for a web widget that has been compiled from source code. For example, according to the Common Language Infrastructure (CLI) of the Microsoft .NET framework, a compiled widget assembly could include one or more library assemblies (e.g., dynamic-link library (DLL) files).

A UI display item, as used herein, refers to a readable identifier such as text or a graphic that is presented to a user, for example, of a website. UI display items are generally identified by a key and generally have at least one value such as, for example, a text string in a language such as English. A manipulated UI display item refers to a UI display item that has been given a new or additional value such as, for example, a value resulting from translation into a different language. For purposes of this patent application, a widget-manipulator application is a software application that produces manipulated UI display items.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
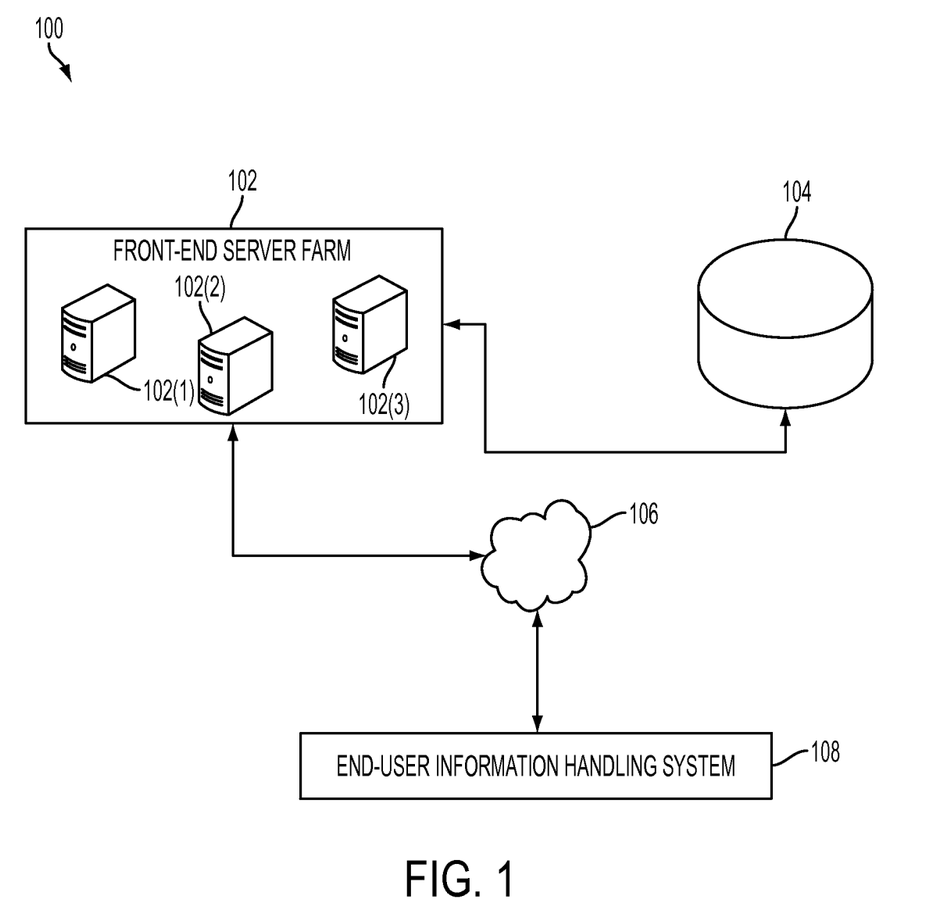
FIG. 1 illustrates a content-management system.

FIG. 1 illustrates a content-management system 100. The content-management system 100 includes a front-end server farm 102, one or more content databases 104, and end-user information handling systems 108. The one or more content databases 104 store content for the content-management system 100. The front-end server farm 102 corresponds to an end-user facing portion of the content-management system 100 and is operable to serve websites containing content from the one or more content databases 104 over a communications network 106 to the end-user information handling systems 108. The communications network 106 can be, for example, the Internet or a public or private intranet.

The front-end server farm 102 is shown to include front-end servers 102(1), 102(2), and 102(3). Although three front-end servers are shown for illustrative purposes, any number of physical or virtual server computers may be utilized in a given implementation. In addition, it should be appreciated that that the content-management system 100 may also include additional servers and databases to perform, for example, back-end functionality (i.e., functionality that is not end-user facing). As described in more detail with respect to FIGS. 2A and 2B, the front-end server farm 102 is operable to manage web widgets, extract and manipulate UI display items for the managed web widgets, and make the manipulated UI display items accessible to end users.

Figure 2A:
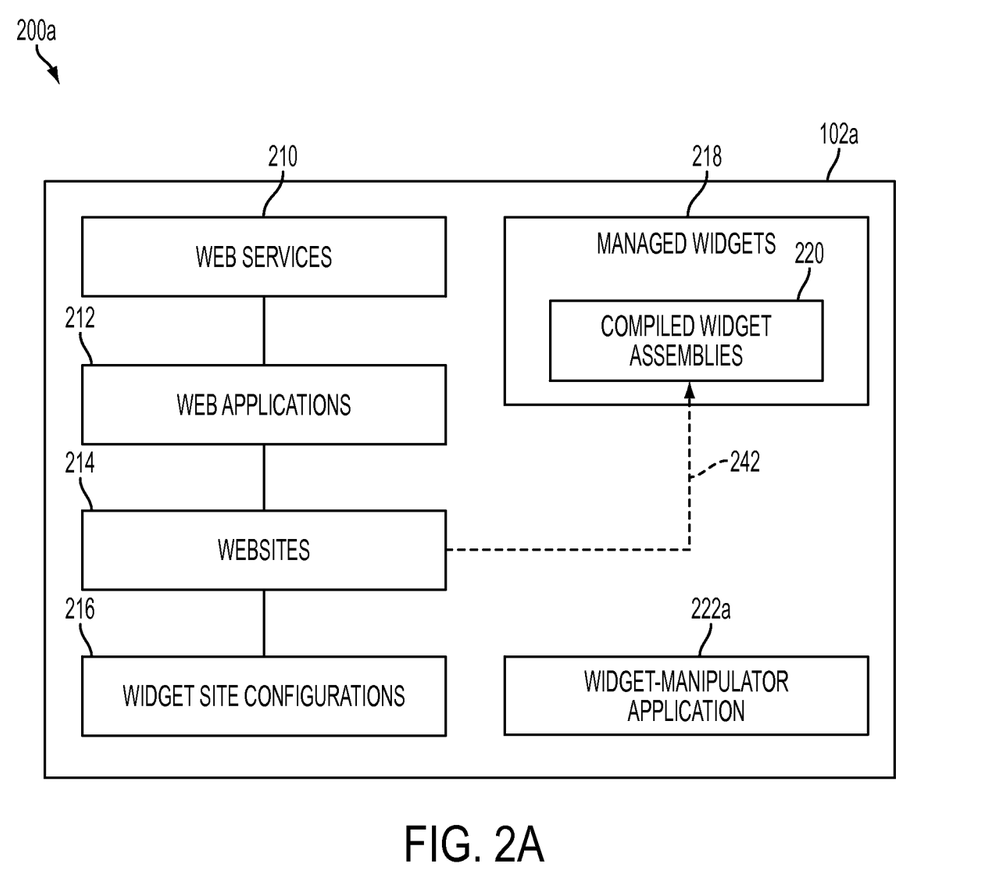
FIG. 2A illustrates a component view of a front-end server farm.

FIG. 2A illustrates a component view 200a of a front-end server farm 102a. In a typical embodiment, the front-end server farm 102a operates as described with respect to the front-end server farm 102 of FIG. 1. The front-end server farm 102a includes, inter alia, web services 210 and web applications 212. The web services 210 provide load-balancing services to front-end servers of the front-end server farm 102a. The web applications 212 provide functionality that allows the front-end server farm 102a to host websites 214 based on a distributed model. The web applications 212 can also manage user access and credentials. For example, in various embodiments, the web applications 212 can correspond to Internet Information Services (IIS) by Microsoft.

The front-end server farm 102a centrally manages a set of managed widgets 218 that are available for use by the websites 214. The managed widgets 218 include a set of compiled widget assemblies 220. The compiled widget assemblies 220 typically include a compiled widget assembly for each managed widget of the managed widgets 218. Each of the managed widgets 218 is typically identified by a globally unique identifier (GUID). The websites 214 collectively maintain pointers 242 to the compiled widget assemblies 220. In particular, each website (of the websites 214) that utilizes a given widget (of the managed widgets 218) contains a pointer (of the pointers 242) that directs the website to an appropriate compiled assembly (of the compiled widget assemblies 220). In that way, the pointers 242 ensure that the websites 214 correctly invoke the compiled widget assemblies 220.

The front-end server farm 102a typically manages the websites 214 according to a management hierarchy that, for example, groups websites into collections and/or allows websites to have subsites. The management hierarchy permits manipulation functionality described herein to be applied to websites and subsites individually or collectively. An example of the management hierarchy will be described with respect to FIG. 3. The websites 214 typically have widget site configurations 216 that customize the managed widgets 218 for the websites 214. The widget site configurations 216 can include, for example, additional UI display items that are not defined by the compiled widget assemblies 220. In various embodiment, the widget site configurations 216 may be embedded as HTML within the web sites 214 or, for example, stored as XML. Therefore, in various embodiments, there may be, for example, many thousands of instances of a given managed widget of the managed widgets 218, with each instance having a pointer in the pointers 242 and customizations in the widget site configurations 216.

In addition, the front-end server farm 102a has a widget-manipulator application 222a resident and executing thereon. The widget-manipulator application 222a is operable to acquire and manipulate UI display items of the managed widgets 218. In a typical embodiment, the widget-manipulator application 222a acquires the UI display items via extraction from the compiled widget assemblies 220 and the widget site configurations 216. In that way, the UI display items can be obtained at a global level (i.e., the compiled widget assemblies 220) and at a website level (i.e., the widget site configurations 216). For ease of reference, UI display items obtained at a global level may be referenced herein as global UI display items. Similarly, UI display items obtained at a website level may be referenced herein as website-level UI display items. As described in greater detail below and with respect to the ensuing Figures, this functionality enables UI display items to be manipulated across all instances of a given web widget.

In a typical embodiment, each of the UI display items is uniquely identified by a key and has at least one original value such as, for example, a text string. In a typical embodiment, the widget-manipulator application 222a manipulates the UI display items by creating at least one new or additional value for each key. For example, the new or additional value can be a translation of a given text string into a different language. After manipulating the UI display items, the widget-manipulator application 222a can further create a new compiled widget assembly that is stored within the compiled widget assemblies 220 (i.e. published). The widget-manipulation application 222a also updates the widget site configurations 216. In a typical embodiment, the widget-manipulator application 222a redirects an appropriate pointer of the pointers 242 to point to the new compiled widget assembly. Subsequently, the web applications 212 is typically restarted. In a typical embodiment, publishing the new compiled widget assembly, updating the widget site configurations 216, redirecting the appropriate pointer, and restarting the web applications 212 collectively result in the manipulated UI display items being made accessible to end users. Examples of extraction, manipulation, and accessibility by redirection will be described in greater detail with respect to the ensuing Figures.

Figure 2B:
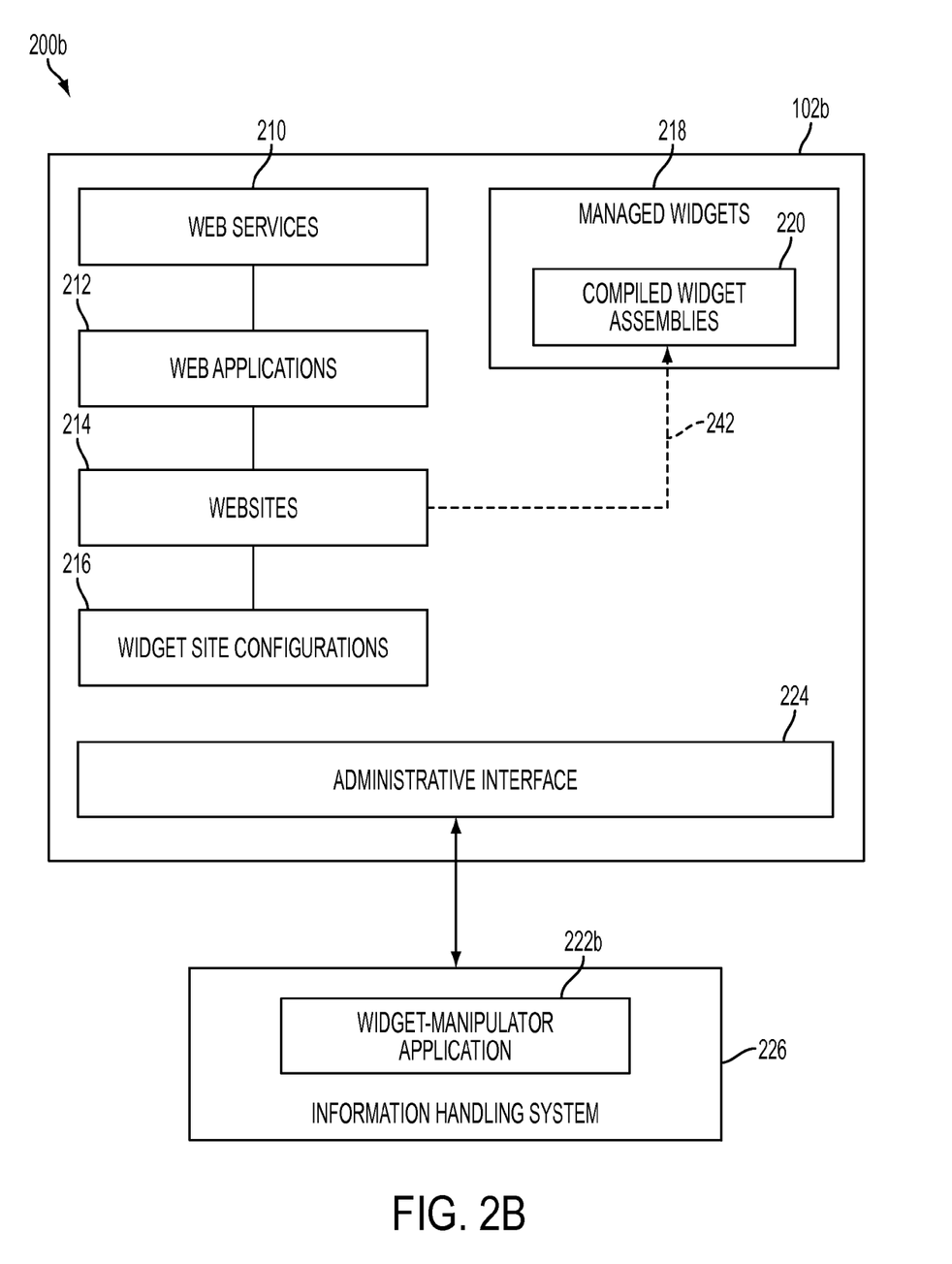
FIG. 2B illustrates a component view of a front-end server farm.

FIG. 2B illustrates a component view 200b of a front-end server farm 102b. The component view 200b is similar to the component view 200a except that a widget-manipulator application 222b is external to the front-end server farm 102b and is resident and executing on an information handling system 226. The information handling system 226 can be, for example, an external web server, a client-computing device, or the like. In various embodiments, the widget-manipulator application 222b is a cloud-based application that accesses the front-end server farm 102b through an administrative interface 224. For example, in various embodiments, the administrative interface 224 can be provided via SharePoint Central Administration by Microsoft. In this fashion, the widget-manipulator application 222b uses the administrative interface 224 to perform the functionality described with respect to the widget-manipulator application 222a of FIG. 2A.

Figure 3:
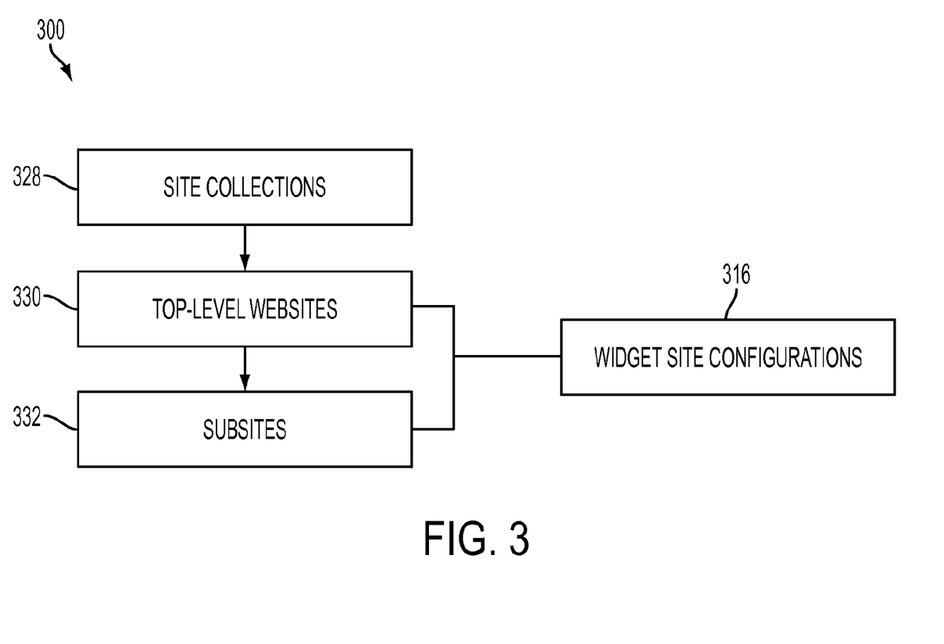
FIG. 3 illustrates a management hierarchy for websites.

FIG. 3 illustrates a management hierarchy 300 for websites such as, for example, the websites 214 of FIGS. 2A and 2B. It should be appreciated that the management hierarchy 300 is exemplary in nature. Other management hierarchies may be utilized without deviating from the inventive principles outlined herein. The management hierarchy 300 includes site collections 328, top-level websites 330, and subsites 332.

Each of the top-level websites 330 represents components and resources used to create and manage a website such as, for example, themes and access to files, folders, and managed web widgets. The site collections 328 are above the top-level websites 330 in the management hierarchy 300. Each of the site collections 328 includes a subset of the top-level websites 330 that can be managed or manipulated as a group. The subsites 332 are beneath the top-level websites 330 in the management hierarchy 300. Each subsite of the subsites 332 is related to a top-level website of the top-level websites 330. However, the subsites 332, like the top-level websites 330, have access to files, folders, and managed web widgets.

The top-level websites 330 and the subsites 332 collectively maintain widget site configurations 316 that customize managed widgets utilized by those sites. In various embodiments, the widget site configurations 316 can be, for example, embedded as HTML within the top-level websites 330 and the subsites 332, as appropriate. In various other embodiments, the widget site configurations 316 can be represented as XML either within the top-level websites 330 and the subsites 332, as appropriate, or separately therefrom.

Figure 4:
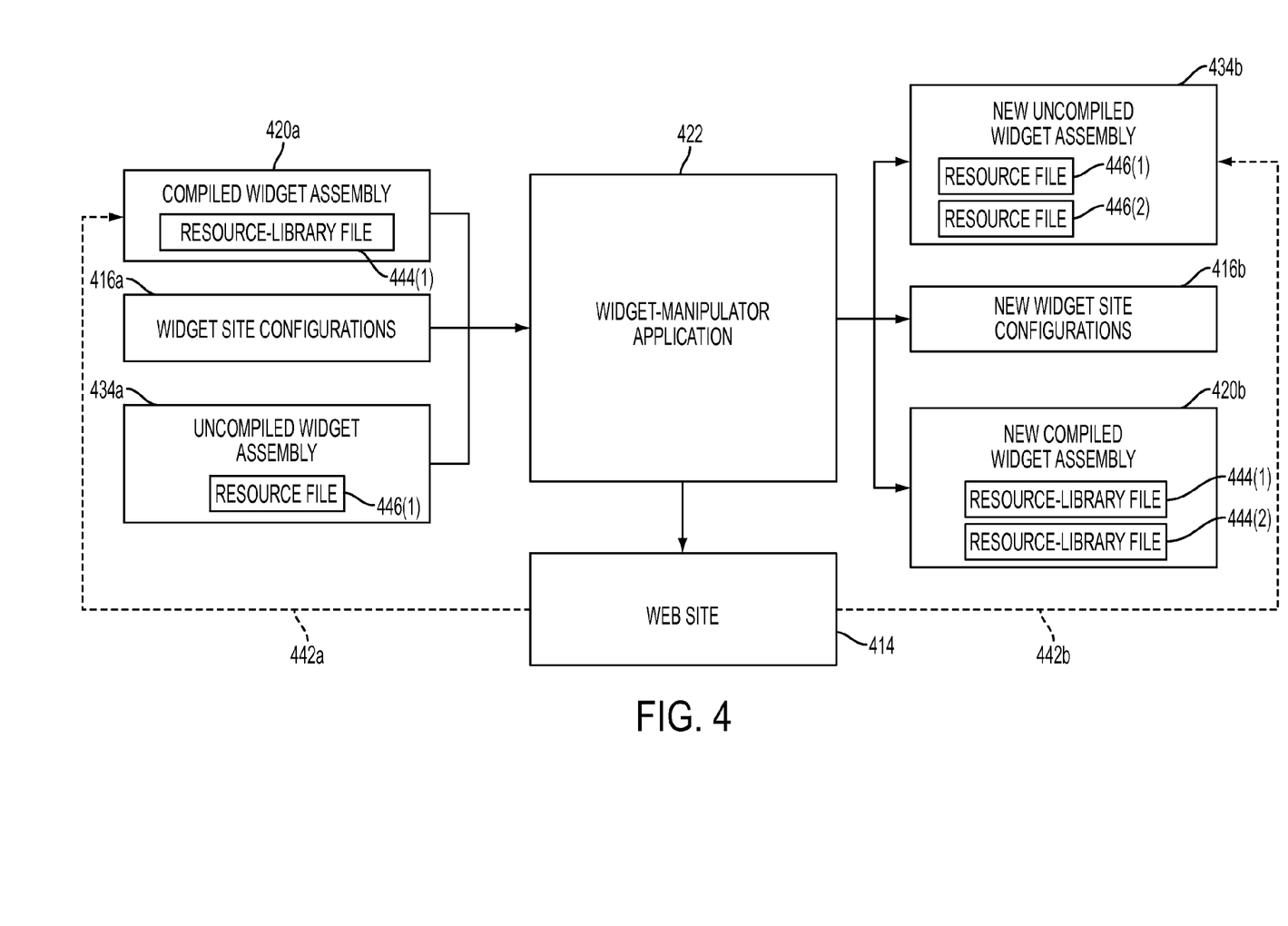
FIG. 4 illustrates exemplary operation of a widget-manipulator application.

FIG. 4 illustrates exemplary operation of a widget-manipulator application 422 to manipulate UI display items. The exemplary operation is illustrated relative to a web-widget instance utilized by a website 414. The web-widget instance may be considered an instance of a managed web widget as described with respect to FIGS. 2A-3. The widget-manipulator application 422 generally operates as described with respect to either the widget-manipulator application 222a of FIG. 2A or the widget-manipulator application 222b of FIG. 2B. In various embodiments, manipulation functionality of the widget-manipulator application 422 is enabled by an availability of a compiled widget assembly 420a, widget site configurations 416a, and an uncompiled widget assembly 434a.

The compiled widget assembly 420a includes a resource-library file 444(1) that can be, for example, a library-assembly file that is in a binary format (e.g., a DLL file). As described in greater detail below, the widget-manipulator application 422 is operable to extract global UI display items and associated values from the resource-library file 444(1). Although only the resource-library file 444(1) is illustrated, in various embodiments, the compiled widget assembly 420a can include a plurality of resource-library files, with the widget-manipulator application 422 being operable to extract a separate set of values for the global UI display items from each resource-library file. Prior to initiation of the widget-manipulator application 422, the website 414 contains a pointer 442a to the compiled widget assembly 420a. Additionally, prior to manipulation, the website 414 includes widget site configurations 416a for the web-widget instance. The widget site configurations 416a can include website-level UI display items embodying customizations of the managed widget and, more particularly, the compiled widget assembly 420a.

The uncompiled widget assembly 434a generally corresponds to source code for the managed widget. The uncompiled widget assembly 434a includes a resource file 446(1) that lists global UI display items and associated values for the managed widget. The resource file 446(1) can be represented, for example, in XML format. Although only the resource file 446(1) is illustrated, in various embodiments, the uncompiled widget assembly 434a can include a plurality of resource files, with each resource file including a separate set of values for the global UI display items.

In a typical embodiment, the uncompiled widget assembly 434a is shielded from access by third parties. For example, in various embodiments, the widget-manipulator application 422 may have the uncompiled widget assembly 434a embedded and hidden therein. In various other embodiments, the widget-manipulator application 422 may have built therein an access key that allows the widget-manipulator application 422 to access and/or decrypt the uncompiled widget assembly 434*a*. In these embodiments, the uncompiled widget assembly 434*a* may be stored and maintained by a third-party software vendor of the managed widget; alternatively, the uncompiled widget assembly 434*a* may be stored and maintained in encrypted form by a front-end server farm such as, for example, the front-end server farms 102, 102*a*, and 102*b* of FIGS. 1, 2A, and 2B, respectively.

Once manipulation of the web-widget instance is initiated, the widget-manipulator application 422 acquires the compiled widget assembly 420*a*, the widget site configurations 416*a*, and the uncompiled widget assembly 434*a*. In various embodiments, the widget-manipulator application 422 extracts the global UI display items from the resource-library file 444(1). However, in various other embodiments, the global UI display items instead may be extracted from the resource file 446(1) contained within the uncompiled widget assembly 434*a*.

In addition to the global UI display items, the widget-manipulator application 422 extracts website-level UI display items from the widget site configurations 416*a*. The global UI display items and the website-level UI display items can then be manipulated by the widget-manipulator application 422. In various embodiments, the manipulation can include development of translated values (e.g., resulting from translation into another language), simple replacement of values, or the like.

In a typical embodiment, after the manipulation, the widget-manipulator application 422 creates a new uncompiled widget assembly 434*b* that contains the resource file 446(1) and a new resource file 446(2). The new resource file 446(2), in a typical embodiment, contains values corresponding to the manipulated global UI display items. Subsequently, the widget-manipulator application 422 compiles the new uncompiled widget assembly 434*b* to yield a new compiled widget assembly 420*b*. The new compiled widget assembly 420*b* includes a new resource-library file 444(2) that, as described with respect to the resource-library file 444(1), is in a binary format. The new resource-library file 444(2) includes, in the binary format, the global UI display items.

In a typical embodiment, the widget-manipulator application makes the manipulated UI display items accessible to end users. In particular, the widget-manipulator application 422 updates the widget site configurations 416*a* based on the manipulated website-level UI display items to yield new widget site configurations 416*b*. In addition, the new compiled widget assembly 420*b* is published by being centrally stored among other compiled widget assemblies such as, for example, the compiled widget assemblies 220 of FIG. 2A. Thereafter, relative to the managed widget, the widget-manipulator application 422 redirects the website 414 to point to the new compiled widget assembly 420*b* via a new pointer 442*b*. The new pointer 442*b* replaces the pointer 442*a*. Once web applications such as, for example, the web applications 212 of FIG. 2, are restarted, the website 214 and the managed widget as manipulated are accessible to end users.

Figure 5:
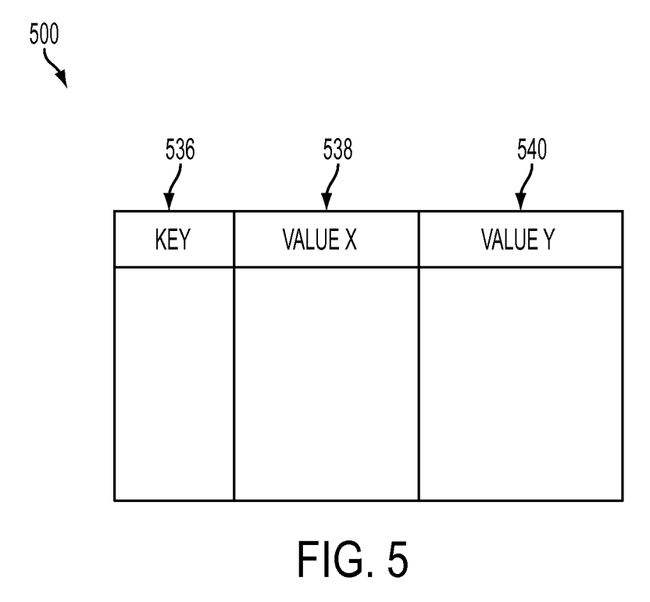
FIG. 5 is a table of UI display items.

FIG. 5 is a table 500 of UI display items. The table 500 is an exemplary product of extraction as described with respect to FIG. 4. The table 500 includes keys 536, original values 538, and manipulated values 540. The keys 536 uniquely identify each UI display item that is extracted. As described with respect to FIG. 4, the UI display items can be extracted at a global level (e.g., from a compiled widget assembly) or at a website level (e.g., from widget site configurations). The original values 536 generally correspond to those values extracted from either the compiled widget assembly or the widget site configurations as described with respect to FIG. 4. The manipulated values 540 generally correspond to new or additional values developed by a widget-manipulator application (e.g., a translation into a different language).

Figure 6:
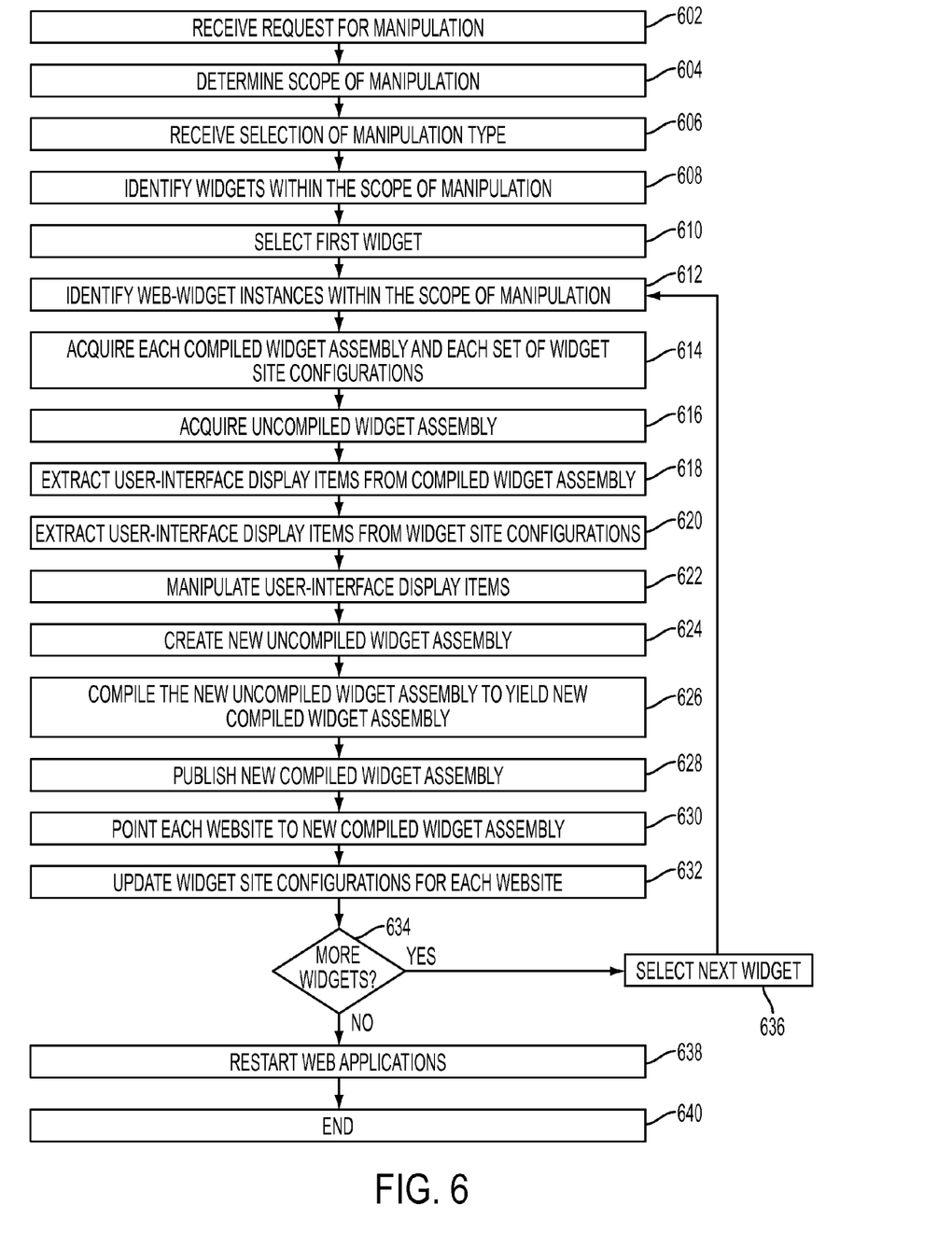
FIG. 6 illustrates a process for manipulating UI display items.

FIG. 6 illustrates a process 600 for manipulating UI display items of web widgets. In a typical embodiment, the process 600 is performed by a widget-manipulator application resident and executing on an information handling system. In various embodiments, the information handling system may be, for example, a front-end server computer of a content-management system as described with respect to FIG. 2A. In various other embodiments, the information handling system may be, for example, external to a given content-management system as described with respect to FIG. 2B. The process 600 begins at step 602.

At step 602, the widget-manipulator application receives a request for manipulation from a requestor. The requestor may be, for example, a website owner, an administrator for a content-management system, a web-widget vendor, or the like. In a typical embodiment, the request is received via a web UI provided by the widget-manipulator application. From 602, the process 600 proceeds to step 604.

At step 604, the widget-manipulator application determines a scope of manipulation. For example, in various embodiments, the request may conform to a website-management hierarchy such as, for example, the website-management hierarchy 300 of FIG. 3. According to this example, the request may specify that the scope of manipulation includes all managed widgets for a given website or collection of websites. By way of further example, the request may specify that the scope of manipulation includes all instances of a given web widget or a selected group of web widgets. From step 604, the process 600 proceeds to step 606.

At step 606, the widget-manipulator application receives a selection of a manipulation type. In various embodiments, the manipulation type can be a translation from a first language such as, for example, English, to a second language such as, for example, Spanish. In a typical embodiment, the manipulation type is solicited and received from the requestor via the web UI provided by the widget-manipulator application. From step 606, the process 600 proceeds to step 608.

At step 608, the widget-manipulator application identifies all widgets within the scope of manipulation. If the request for manipulation specifies a particular widget, the widget-manipulator application only identifies that widget at step 608. However, if, for example, the scope of manipulation specifies a collection of websites, the widget-manipulator application identifies all web widgets utilized by those websites. From step 608, the process 600 proceeds to step 610.

At step 610, the widget-manipulator application selects a first widget from among the widgets identified at step 608. From step 610, the process 600 proceeds to step 612. At step 612, the widget-manipulator application identifies all instances of the selected widget that are within the scope of manipulation. In a typical embodiment, instances of each web widget can be identified by a name associated therewith. For example, in various embodiments, each instance's name can include a GUID for the web widget that is appended with a unique ID (e.g., a numerical ID) for the instance. Optionally, the identified instances can be presented to the requestor for verification. From step 612, the process 600 proceeds to step 614.

At step 614, the widget-manipulator application acquires a compiled widget assembly and a set of widget site configurations for each widget instance (i.e., website). From step 614, the process 600 proceeds to step 616. At step 616, the widget-manipulator application acquires an uncompiled widget assembly corresponding to the compiled widget assembly. In a typical embodiment, the uncompiled widget assembly is acquired as described with respect to FIG. 4. From step 616, the process 600 proceeds to step 618.

At step 618, the widget-manipulator application extracts global UI display items from the compiled widget assembly. In a typical embodiment, the extraction is performed as described with respect to FIGS. 4-5. From step 618, the process 600 proceeds to step 620. At step 620, the widget-manipulator application extracts website-level UI display items from each set of widget site configurations. In a typical embodiment, the website-level UI display items are extracted from widget site configurations as described with respect to FIGS. 4-5. From step 620, the process 600 proceeds to step 622.

At step 622, the widget-manipulator application manipulates the UI display items extracted at steps 618 and 620 based on the manipulation type. The manipulation yields manipulated UI display items. The manipulated UI display items include manipulated global UI display items and, for each widget instance, manipulated website-level UI display items. An exemplary manipulation will be described with respect to FIGS. 7-8. From step 622, the process 600 proceeds to step 624. At step 624, the widget-manipulator application creates a new uncompiled widget assembly based on the manipulated global UI display items. In a typical embodiment, the new uncompiled widget assembly is created as described with respect to the new uncompiled widget assembly 434b of FIG. 4. From step 624, the process 600 proceeds to step 626.

At step 626, the widget-manipulator application compiles the new uncompiled widget assembly to yield a new compiled widget assembly. From step 626, the process 600 proceeds to step 628. At step 628, the new uncompiled widget assembly is published. In a typical embodiment, publication results in the new uncompiled widget assembly being centrally stored among other compiled widget assemblies such as, for example, the compiled widget assemblies 220 of FIG. 2A. From step 628, the process 600 proceeds to step 630. At step 630, the widget-manipulator application redirects each website covered by the scope of manipulation to point to the new compiled widget assembly. From step 630, the process 600 proceeds to step 632. At step 632, the widget-manipulator application updates the widget site configurations for each website covered by the scope of manipulation based on the manipulated UI display items corresponding to that website. From step 632, the process 600 proceeds to step 634.

At step 634, the widget-manipulator application determines whether there are more widgets that need to be manipulated. If so, the process 600 proceeds to step 636. At step 636, the widget-manipulator application selects a next widget from the widgets identified at step 608. From step 636, the process 600 proceeds to step 612 and executes as described above. If it is determined at step 634 that there are no more widgets that need to be manipulated, the process 600 proceeds to step 638. At step 638, web applications such as, for example, the web applications 212 of FIG. 2, are restarted. At this point, the manipulated UI display items are accessible to end users. From step 638, the process 600 proceeds to step 640. At step 640, the process 600 ends.

Figure 7:
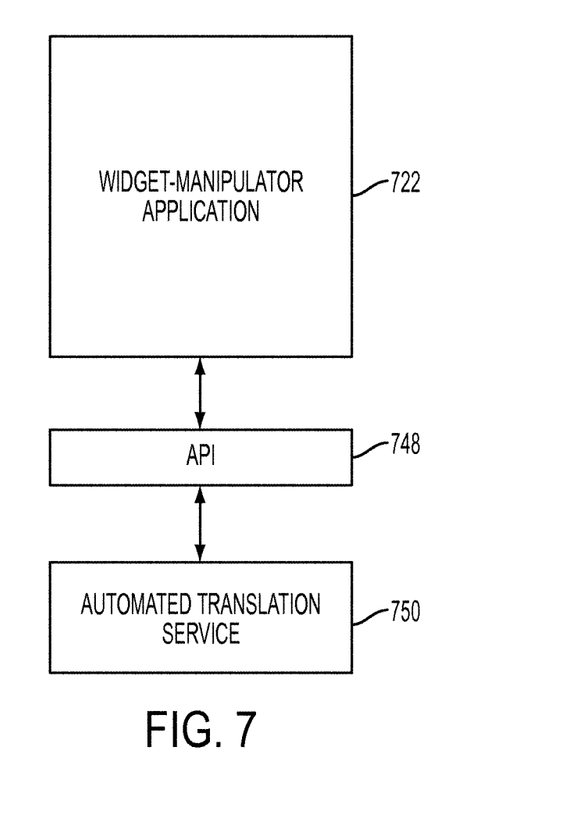
FIG. 7 illustrates exemplary operation of a widget-manipulator application.

FIG. 7 illustrates exemplary operation of a widget-manipulator application 722 to translate UI display items. The widget-manipulator application 722 is operable to transmit values associated with extracted UI display items to an automated translation service 750 via an application programming interface (API) 748 associated therewith. In typical embodiment, the automated translation service 750 returns machine translations of the transmitted values to the widget-manipulator application 722. The returned machine translations thereby represent manipulated UI display items as described with respect to FIGS. 2A-6.

Figure 8:
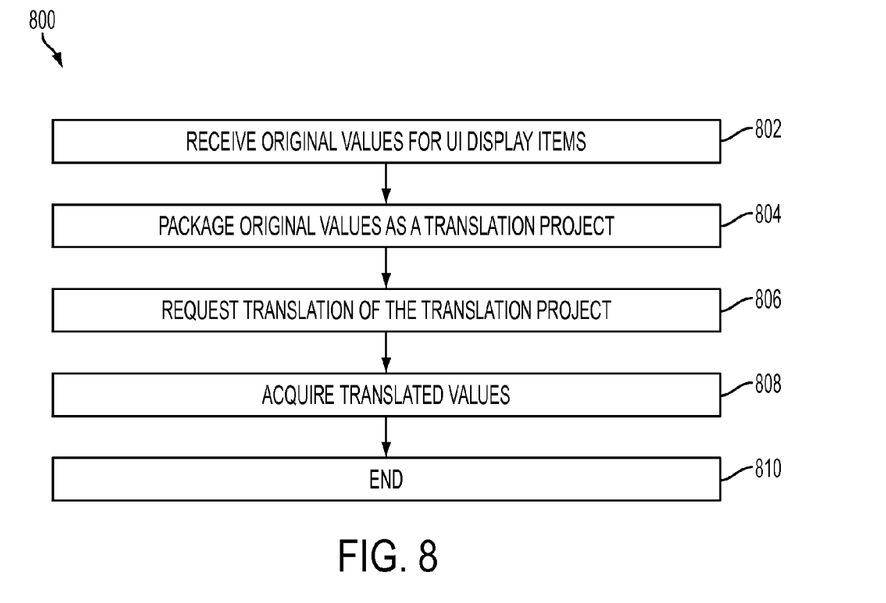
FIG. 8 illustrates a process for translating UI display items.

FIG. 8 illustrates a process 800 for translating UI display items of web widgets. In a typical embodiment, the process 800 is performed by a widget-manipulator application resident and executing on an information handling system. In various embodiments, the information handling system may be, for example, a front-end server computer of a content-management system as described with respect to FIG. 2A. In various other embodiments, the information handling system may be, for example, external to a given content-management system as described with respect to FIG. 2B. In a typical embodiment, the process 800 may be performed as all or part of step 622 of the process 600 of FIG. 6. The process 800 begins at step 802.

At step 802, the widget-manipulator application receives original values for a set of UI display items. For example, in a typical embodiment, the original values correspond to values extracted as described with respect to steps 618 and 620 of the process 600 of FIG. 6. From step 802, the process 800 proceeds to step 804. At step 804, the widget-manipulator application packages the original values as a translation project. From step 804, the process 800 proceeds to step 806. At step 806, the widget-manipulator application requests translation of the translation project. In various embodiments, translation can be requested from an automated translation service as described with respect to FIG. 7. In various other embodiments, manual translation can be requested, for example, by transmitting the translation project to an individual. From step 806, the process 800 proceeds to step 808.

At step 808, the widget-manipulator application acquires translated values for the translation project. In various embodiments, the translated values may be acquired from the automated translation or from the individual from whom manual translation was requested. At this point, the translated values represent manipulated UI display items as described with respect to FIGS. 2A-6. From step 808, the process 800 proceeds to step 810. At step 810, the process 800 ends.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
    on an information handling system, receiving a request for web-widget manipulation, the request comprising a scope of manipulation;
    identifying, by the information handling system, at least one managed web widget as being covered by the scope of manipulation;
    identifying, by the information handling system, at least one instance of the at least one managed web widget as being covered by the scope of manipulation;
    extracting, by the information handling system, a plurality of user-interface (UI) display items relative to the at least one managed web widget and the at least one instance, wherein the plurality of UI display items comprises at least one global UI display item and at least one website-level UI display item;
    wherein the extracting comprises:

extracting the at least one global UI display item from an uncompiled widget assembly corresponding to the at least one managed web widget; and extracting the at least one website-level UI display item from site configurations for the at least one instance;

manipulating, by the information handling system, at least one textual value associated with each of the plurality of UI display items to yield manipulated UI display items;

wherein the manipulated UI display items comprise at least one manipulated global UI display item and at least one manipulated website-level UI display item;

creating a new uncompiled widget assembly based on the at least one manipulated global UI display item compiling the new uncompiled widget assembly to yield a new compiled widget assembly; and making a website associated with the at least one instance accessible to end users as manipulated.

2. The method of claim 1, wherein the manipulating comprises:
packaging each at least one textual value as a translation project;
requesting translation of the translation project;
acquiring at least one translated value for each of the plurality of UI display items; and
wherein the manipulated UI display items comprise each at least one translated value.

3. The method of claim 1, wherein the making comprises:
publishing the new compiled widget assembly;
redirecting the website to point to the new compiled widget assembly;
updating the site configurations based on the at least one manipulated web site-level UI display item; and
restarting web applications.

4. The method of claim 1, wherein the at least one managed web widget comprises a plurality of managed web widgets.

5. The method of claim 1, wherein the at least one instance comprises a plurality of instances of the at least one managed web widget.

6. The method of claim 1, wherein the information handling system comprises a content-management system on which the at least one managed web widget is managed.

7. The method of claim 1, wherein the information handling system is external to a content-management system on which the at least one managed web widget is managed.

8. An information handling system comprising:
a processor, wherein the processor is operable to:
receive a request for web-widget manipulation, the request comprising a scope of manipulation;
identify at least one managed web widget as being covered by the scope of manipulation;
identify at least one instance of the at least one managed web widget as being covered by the scope of manipulation;
extract a plurality of user-interface (UI) display items relative to the at least one managed web widget and the at least one instance, wherein the plurality of UI display items comprises at least one global UI display item and at least one website-level UI display item;
wherein the extraction comprises:
extraction of the at least one global UI display item from an uncompiled widget assembly corresponding to the at least one managed web widget; and
extraction of the at least one website-level UI display item from site configurations for the at least one instance;
manipulate at least one textual value associated with each of the plurality of UI display items to yield manipulated UI display items;
wherein the manipulated UI display items comprise at least one manipulated global UI display item and at least one manipulated website-level UI display item;
create a new uncompiled widget assembly based on the at least one manipulated global UI display item
compile the new uncompiled widget assembly to yield a new compiled widget assembly; and
make a website associated with the at least one instance accessible to end users as manipulated.

9. The information handling system of claim 8, wherein the manipulation comprises:
packaging each at least one textual value as a translation project;
requesting translation of the translation project;
acquiring at least one translated value for each of the plurality of UI display items; and
wherein the manipulated UI display items comprise each at least one translated value.

10. The information handling system of claim 8, wherein the make comprises:
publishing the new compiled widget assembly;
redirecting the website to point to the new compiled widget assembly;
updating the site configurations based on the at least one manipulated web site-level UI display item; and
restarting web applications.

11. The information handling system of claim 8, wherein the at least one managed web widget comprises a plurality of managed web widgets.

12. The information handling system of claim 8, wherein the at least one instance comprises a plurality of instances of the at least one managed web widget.

13. The information handling system of claim 8, wherein the information handling system comprises a content-management system on which the at least one managed web widget is managed.

14. A computer-program product comprising a non-transitory computer-usable medium having computer-readable program code embodied therein, the computer-readable program code adapted to be executed to implement a method comprising:
receiving a request for web-widget manipulation, the request comprising a scope of manipulation;
identifying at least one managed web widget as being covered by the scope of manipulation;
identifying at least one instance of the at least one managed web widget as being covered by the scope of manipulation;
extracting a plurality of user-interface (UI) display items relative to the at least one managed web widget and the at least one instance, wherein the plurality of UI display items comprises at least one global UI display item and at least one website-level UI display item;
wherein the extracting comprises:
extracting the at least one global UI display item from an uncompiled widget assembly corresponding to the at least one managed web widget; and
extracting the at least one website-level UI display item from site configurations for the at least one instance;
manipulating, by the information handling system, at least one textual value associated with each of the plurality of UI display items to yield manipulated UI display items;

wherein the manipulated UI display items comprise at least one manipulated global UI display item and at least one manipulated website-level UI display item;
creating a new uncompiled widget assembly based on the at least one manipulated global UI display item
compiling the new uncompiled widget assembly to yield a new compiled widget assembly; and
making a website associated with the at least one instance accessible to end users as manipulated.

15. The method of claim 1, wherein the extracting the at least one global UI display item further comprises shielding the uncompiled widget assembly from access by third parties.

* * * * *